(12) United States Patent
Scott

(10) Patent No.: US 6,483,059 B1
(45) Date of Patent: Nov. 19, 2002

(54) MOTOR VEHICLE TOW HITCH FAILURE SIGNAL DEVICE

(76) Inventor: Charles H. Scott, Rt. 1, Box 293-B, Danville, AR (US) 72833

( * ) Notice: Subject to any disclaimer, the term of this patent is extended or adjusted under 35 U.S.C. 154(b) by 0 days.

(21) Appl. No.: 09/799,938

(22) Filed: Mar. 6, 2001

(51) Int. Cl.⁷ ................................................ H01H 3/20
(52) U.S. Cl. ..................................... 200/331; 280/432
(58) Field of Search .......................... 200/331; 280/420, 280/422, 432

(56) References Cited

U.S. PATENT DOCUMENTS

| | | | | |
|---|---|---|---|---|
| 3,479,057 A | * | 11/1969 | Miller ........................ | 280/511 |
| 3,792,432 A | * | 2/1974 | Ellis et al. ................ | 340/52 R |
| 3,832,501 A | * | 8/1974 | Amnotte ................... | 200/61.19 |
| 3,858,907 A | * | 1/1975 | Van Raden ................. | 280/422 |
| 4,271,401 A | * | 6/1981 | Meo ........................... | 340/52 D |
| 5,762,167 A | * | 6/1998 | Hendrix ..................... | 188/112 R |

* cited by examiner

Primary Examiner—Elvin Enad
Assistant Examiner—Lisa N Klaus
(74) Attorney, Agent, or Firm—Frank J. Catalano

(57) ABSTRACT

A device signals possible failure of a typical ball-and-socket hitch. A breakaway switch on the rear of the towing vehicle has an actuating member positioned substantially immediately above the ball of the hitch. A bracket is mounted on the front of the towed vehicle at substantially the midpoint between the tow bar outer ends. A cable connected between the actuating member and the bracket has a length selected such that, when the distance between the switch and the second bracket exceeds a predetermined threshold, the cable pulls the actuating member rearwardly to actuate the switch, causing an indicator circuit in the towing vehicle to give an audible or visual signal.

7 Claims, 2 Drawing Sheets

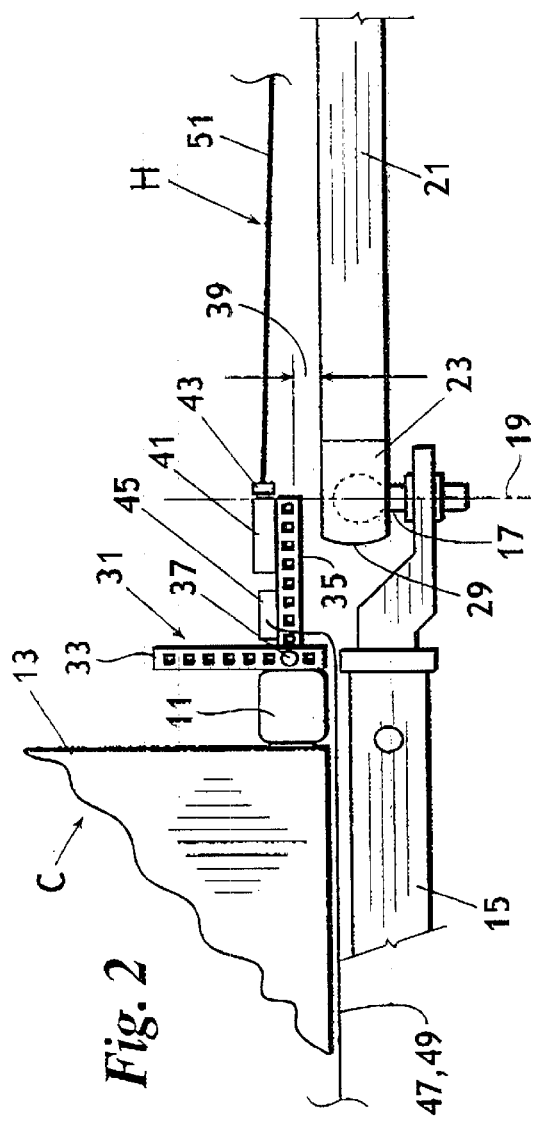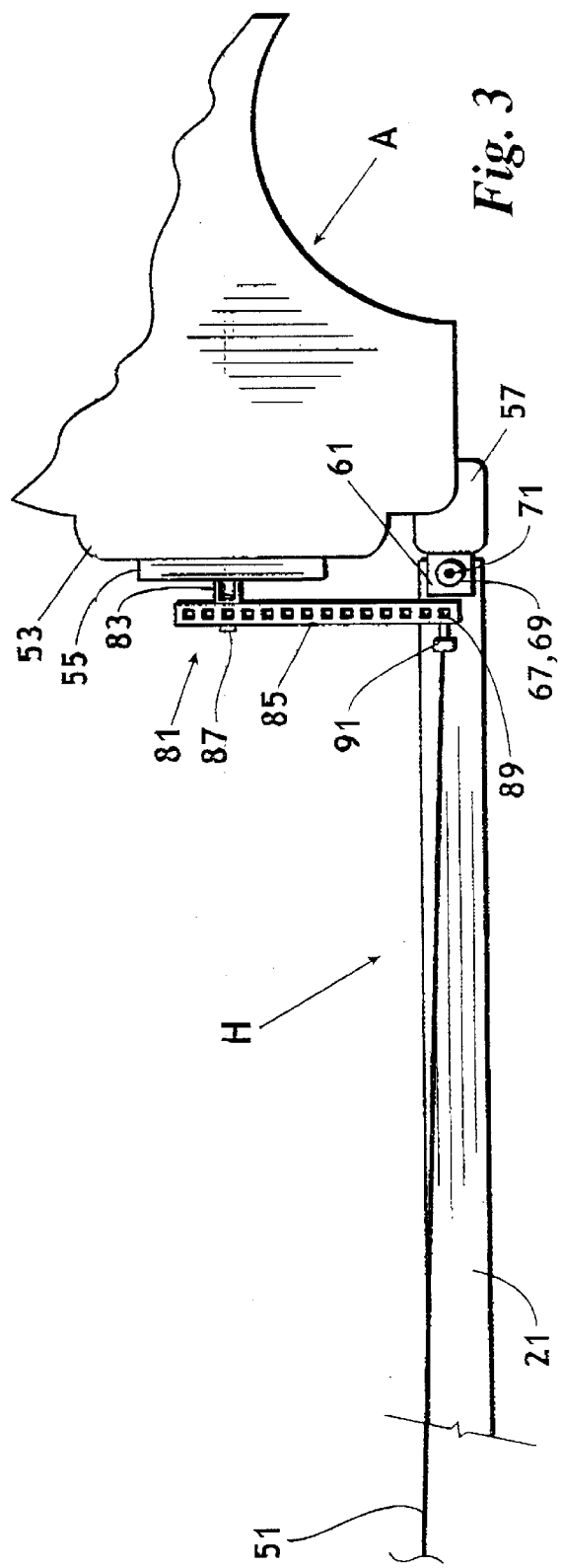

MOTOR VEHICLE TOW HITCH FAILURE SIGNAL DEVICE

BACKGROUND OF THE INVENTION

This invention relates generally to motor vehicle tow hitches and more particularly concerns a signal device capable of providing an early indication of a tow hitch failure.

Typically, a ball-and-socket hitch is used to connect a towed vehicle to a towing vehicle. The ball is mounted at the rear of the towing vehicle and the hitch is a wishbone-shaped tow bar with a socket at the neck of the wishbone. The ball-and-socket provides a generally universal range of motion at the towing vehicle to accommodate changes in direction and incline. The outer ends of the wishbone are coaxially pivotally connected to the front of the tow vehicle to accommodate changes in incline.

In operation, a variety of failures can occur in the hitch assembly. The ball it mounted on the towing vehicle. The socket is seated over the ball. The outer ends of the tow bar are pivoted. The pivots are mounted on the front of the towed vehicle. In addition, the towing vehicle, the tow bar and the towed vehicle all include welded or otherwise joined subcomponents. Failure at any connection point in the hitch assembly could result in loss of control or even complete loss of connection with the towed vehicle.

Presently, brake lock systems exist which are activated only if the hitch or the towed vehicle has separated from the towing vehicle. These systems could provide an indication of the failure to the towing vehicle occupants, but only subsequent to the separation.

It is, therefore, an object of this invention to provide a signal device which alerts the occupants of the towing vehicle upon occurrence of any condition in the hitch assembly which allows the distance from the rear center of the towing vehicle to the front center of the towed vehicle to exceed a threshold. Another object of this invention is to provide a signal device which uses the battery of the towing vehicle to power its indicator circuit. A further object of this invention is to provide a signal device which uses the horn of the towing vehicle as an audible indicator of hitch failure. Yet another object of this invention is to provide a signal device which is adaptable for use with a variety of towing vehicles. It is also an object of this invention to provide a signal device which is adaptable for use with a variety of towed vehicles.

SUMMARY OF THE INVENTION

In accordance with the invention, a signal device is provided which is capable of giving an early indication of a failure of a typical ball-and-socket hitch. Such hitches have a wishbone-shaped tow bar. The tow bar is universally pivotally connected at its socket to the ball which is mounted on the rear of the towing vehicle. The tow bar is coaxially pivotally connected at its outer ends to the front of the towed vehicle. The device includes a break-away switch mounted on a first bracket. The first bracket is adapted to be mounted on the rear of the towing vehicle with the actuating member of the switch positioned substantially immediately above the ball of the hitch and at a rear of the switch. A second bracket is mounted on the front of the towed vehicle at substantially the midpoint of the pivotal axis between the tow bar outer ends. A cable is connected between the actuating member and the second bracket. The cable has a length such that, when the distance between the switch and the second bracket exceeds a predetermined threshold, the cable pulls the actuating member rearwardly to actuate the switch. Preferably, a clamp mounted on the second bracket allows adjustment of the length of the cable between the switch and the second bracket to set the predeterminable threshold. An indicator circuit in the towing vehicle is actuated in response to operation of the breakaway switch. The indicator circuit provides an audible and/or a visual signal upon actuation. Preferably, adapters connect the breakaway switch to the horn circuit of the towing vehicle so that the towing vehicle horn is activated in response to operation of the breakaway switch.

BRIEF DESCRIPTION OF THE DRAWINGS

Other objects and advantages of the invention will become apparent upon reading the following detailed description and upon reference to the drawings in which:

FIG. 2 is a side elevation view illustrating the connection of the signal device to the towing vehicle or coach of FIG. 1;

FIG. 3 is a side elevation view illustrating the connection the connection of the second device to the towed vehicle or car of FIG. 1;

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
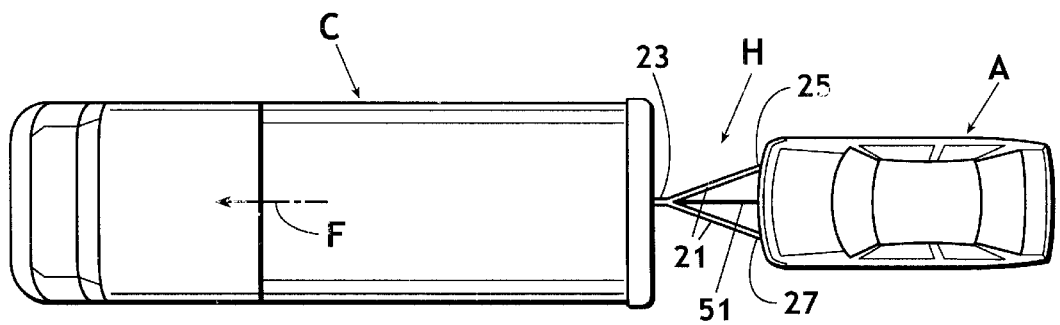
FIG. 1 is a top plan view illustrating a tow hitch connected between a coach and a car with a signal device mounted thereon.

Turning first to FIG. 1, a typical hitch assembly uses a hitch H to connect a towing vehicle such as a coach C to a towed vehicle such as an automobile A. The direction of forward motion F of the towing vehicle C is used to establish the front and back relationships of all of the structural components hereinafter discussed.

Looking at FIG. 2, a rear bumper 11 extends across the lower rear portion 13 of the towing vehicle C. A receiving hitch 15 mounted on the chassis (not shown) of the towing vehicle C extends rearwardly of the towing vehicle C to the hitch ball 17. As seen in FIG. 1, the longitudinal axis of the receiving hitch 15 is aligned with the longitudinal center axis of the towing vehicle C. Therefore, the vertical axis 19 of the ball 17 intersects the longitudinal axis of the towing vehicle C. The wishbone shaped tow bar 21 extends from its neck 23 to its outer ends 25 and 27 and the socket 29 in the neck 23 is seated on the ball 17. The ball-and-socket joint 17 and 29 affords a substantially universal range of motion so that the angular position of the tow bar 21 in relation to the longitudinal axis of the towing vehicle C can shift in a horizontal plane as the towing vehicle C turns to the left or right and in a vertical plane as the towing vehicle C traverses varying inclines. The above described assembly of a hitch H to a towing vehicle C is well known and no further explanation is herein required.

Continuing with FIG. 2, to connect the signal device to the towing vehicle C a bracket 31 is preferred which includes a vertical member 33 fixed to the towing vehicle C at its rear and aligned with the longitudinal center axis of the towing vehicle C. As shown, the vertical member 33 is a channel having perforated sidewalls and secured to the bumper 11 of the towing vehicle C with the open web of the channel 33 facing to the rear. A horizontal member 35 extends rearwardly from the vertical member 33 parallel to the longitudinal center axis of the towing vehicle C. As shown, the horizontal member 35 is preferably a channel having perforated sidewalls with the open web of the channel facing downwardly when the member 35 is in a horizontal position. The forward end of the horizontal member 35 is pivotally connected to the vertical member 33 so that the horizontal member 35 can rotate in a vertical plane. In the preferred embodiment, the horizontal channel 35 fits within the web of the vertical member 33 so that the perforations in the front end of the horizontal member 35 can be aligned with the perforations in the vertical member 33 at a selected elevation. As shown, a pivot pin 37 such as a bolt and nut is extended through the aligned apertures at the selected elevation to pivotally connect the horizontal member 35 to the vertical member 33. The elevation of the pin 37 is selected so that the distance 39 between the horizontal member 35 and the top of the tow bar 21 is as small as possible. A breakaway switch 41 having an actuating member 43 is mounted on the rear upper portion of the horizontal member 35. As shown, the actuating member 43 is at the rear of the switch 41 and is substantially aligned with the vertical axis 19 of the ball 17. As shown, the length of the horizontal member 35 is such that, as the member 35 pivots in relation to the vertical member 33, the end of the horizontal member 35 on which the switch 41 is disposed can rest on top of the receptacle 29 of the tow bar 21. The actuating member 43 is connected to the front end of a cable 51, preferably an aircraft cable. A two-way male/female disconnect 45 mounted on the horizontal member 35 between the switch 41 and the vertical member 33 has a pair of conductors, preferably two sixteen gauge wires 47 and 49 which are connected to the electrical system of the towing vehicle C, as will hereafter be explained.

Figure 4:
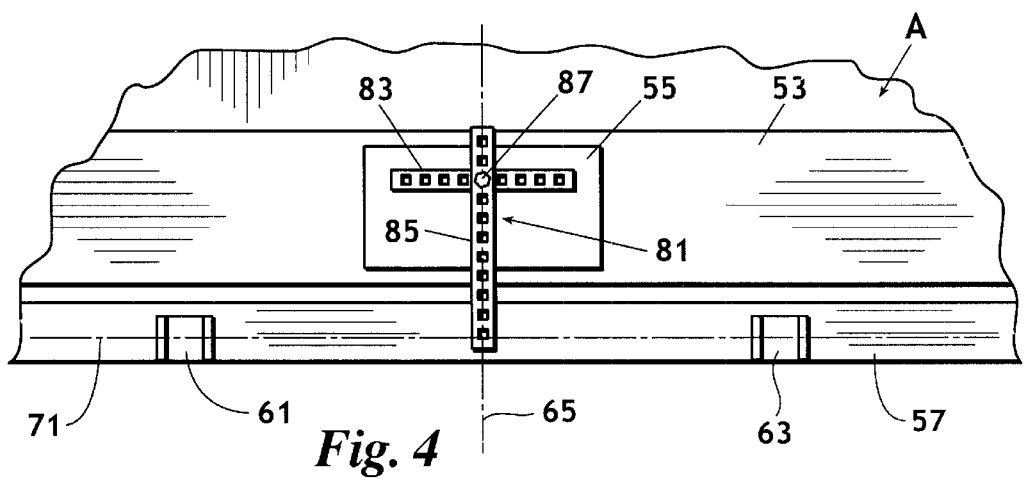
FIG. 4 is a rear elevation view illustrating the connection of the signal device to the towed vehicle or car of FIG. 1.

Looking now at FIGS. 3 and 4, the towed vehicle A has a bumper 53, as shown with a license plate holder 55. A spoiler 57 extends horizontally across the towed vehicle A. A pair of tow bar brackets 61 and 63 for receiving the outer ends 25 and 27 of the tow bar 21 are symmetrically displaced from the vertical midpoint axis 65 of the towed vehicle A. The tow bar outer ends 25 and 27 are connected by pivot pins 67 and 69 for rotation about a common horizontal axis 71. The pivot pins 67 and 69 permit angular movement of the towed vehicle A in relation to the tow bar 21 in a vertical plane to accommodate traversal over varying inclines by the towed vehicle A. The above described connection of the tow bar 21 to the towed vehicle A is well known and need not further be discussed herein.

To connect the signal device to the towed vehicle A, a second bracket 81 has a horizontal member 83 to which is fixed a vertical member 85. The vertical member 85 is secured to the front of the towed vehicle A, that is the end of the towed vehicle A closest to the towing vehicle C, so that the vertical member 85 is aligned on the midpoint axis 65 of the towed vehicle A. As shown, the preferred horizontal and vertical member 83 and 85 are channels having their web portions perforated so that they can be connected by a bolt and nut 87 in a T configuration. The vertical member 85 is sufficiently long so as to extend substantially to the level of the common horizontal axis 71 of the tow bar pivots 67 and 69 when the horizontal member 83 is fixed to the towed vehicle A. The other end of the cable 51 is connected to the vertical member 85 substantially at the level of the common horizontal axis 71.

The above described brackets 31 and 81 are preferred as being most universally applicable to all types of towing and towed vehicles A and C. It is essential to the operation of the signal device that the actuating member 43 of the breakaway switch 41 be disposed as close as possible to the ball 19 of the hitch and that the other end of the cable 51 be connected as close as possible to the midpoint of the common horizontal axis 71 between the tow bar pivots 67 and 69. It is also essential that the breakaway switch 41 be mounted to the towing vehicle C or the receiving hitch 15 and not to the tow bar 21. It is further essential that the other end of the cable is fixed to the towed vehicle A and not to the tow bar 21. Any brackets achieving these requirements so as to properly position the actuating member 43 of the breakaway switch 41 and the other end of the cable 51 can be used. Many such brackets will be apparent to those skilled in the art.

Looking at FIG. 3, the end of the cable 51 can be attached to the second bracket 81 by use of any suitable clamp 91. However, it is preferred that an adjustable clamp or clevis be used so as to permit adjustment of the tautness of the cable 51 extending between the actuating member 43 and the clamp 91. The tautness of the cable 51 is preferably adjustable so that, if the distance from the breakaway switch 41 to the second bracket 81 exceeds a predetermined threshold, the cable 51 will pull the actuating member 43 rearwardly to actuate the breakaway switch 41. This threshold actuating distance is preferably such that, when the distance between the actuating member 43 and the bracket 81 increases by an increment of more than one inch, the breakaway switch 41 will be actuated. Variations in this increment up to a change of approximately three inches are possible, depending on the desired sensitivity of the device.

Figure 5:
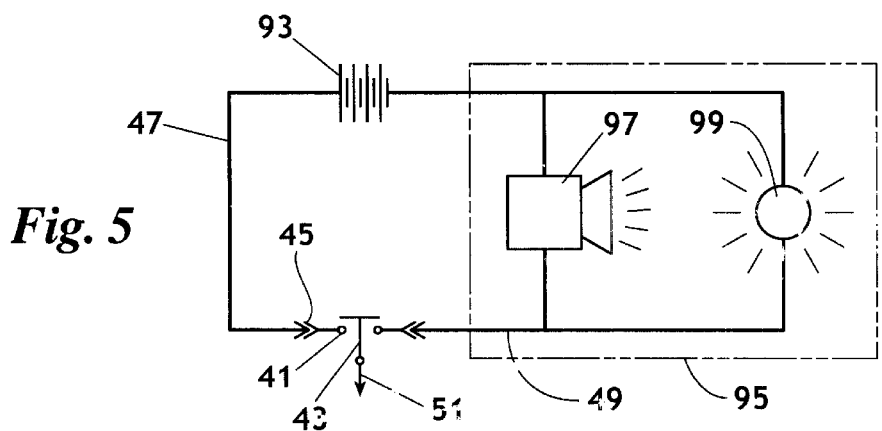
FIG. 5 is a schematic diagram illustrating a preferred embodiment of the signal device electrical circuit.

Looking at FIG. 5, the disconnect 45 is used to connect the breakaway switch 41 between the conductors 47 and 49. One conductor 47 connects one side of the switch 41 to the battery 93 of the towing vehicle C and the other conductor 49 connects the other side of the switch 41 to the indicator circuits 95. As shown, the indicator circuit 95 may include the towing vehicle horn 97 and/or a visual indicating light 99. Alternatively, the device may incorporate its own audible and/or visual indicator elements.

In operation, with the components of the device mounted as hereinbefore described, as the towing and towed vehicles C and A traverse inclines and curves, the slack afforded by the tension adjustment between the ends of the cable 51 permits the vehicles C and A to travel without actuating the breakaway switch 41. This is the result of fixing the ends of the cable 51 in as close relation as possible to the ball 17 and to the midpoint 89 between the coaxial pivots 61 and 63. While some variation is permissible and may be structurally required by the particular vehicles C and A and hitches H involved, deviations in positioning the connection points of the ends of the cable 51 lowers the sensitivity of the device. If properly mounted, any looseness or separation in or between any of the structural components interconnecting the towing vehicle C, the hitch H and the towed vehicle A so as to exceed the predetermined threshold will actuate the switch 41 and cause a visual and/or audible alert to be given to the occupants of the towing vehicle C.

Thus, it is apparent that there has been provided, in accordance with the invention, a motor vehicle tow hitch failure signal device that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For signaling a failure of a ball-and-socket hitch having a wishbone-shaped tow bar universally pivotally connected at its socket to the ball mounted on a rear of a towing vehicle and coaxially pivotally connected at its outer ends to a spoiler mounted on a front of a towed vehicle, a device comprising a break-away switch mounted on a first bracket, said first bracket being adapted to be mounted on a rear of the towing vehicle with an actuating member of said switch positioned immediately above the ball of the hitch and at a rear of said switch, a second bracket mounted on a front of the towed vehicle at substantially a midpoint between the tow bar outer ends and a cable connected between said actuating member and said second bracket, said cable having a length such that, when a distance between said switch and said second bracket exceeds a predetermined threshold, said cable pulls said actuating member rearwardly to actuate said switch.

2. A device according to claim 1 further comprising means for allowing adjustment of said length of said cable between said switch and said second bracket.

3. A device according to claim 2, said means for allowing adjustment of said length of said cable comprising a clamp mounted on said second bracket.

4. A device according to claim 1 further comprising an indicator circuit in the towing vehicle which is activated in response to operation of said breakaway switch.

5. A device according to claim 4, said indicator circuit providing an audible signal upon activation thereof.

6. A device according to claim 4, said indicator circuit providing a visual signal upon activation thereof.

7. A device according to claim 1 further comprising adapters for connecting said breakaway switch in a horn circuit of the towing vehicle whereby the horn is activated in response to operation of said breakaway switch.

* * * * *